Dec. 8, 1964  A. A. VERCESI ETAL  3,160,810
POTENTIOMETER LINEARITY TESTING MACHINE WITH MEANS
TO PREVENT GROOVING OF WIPER
Filed June 20, 1960  9 Sheets-Sheet 1
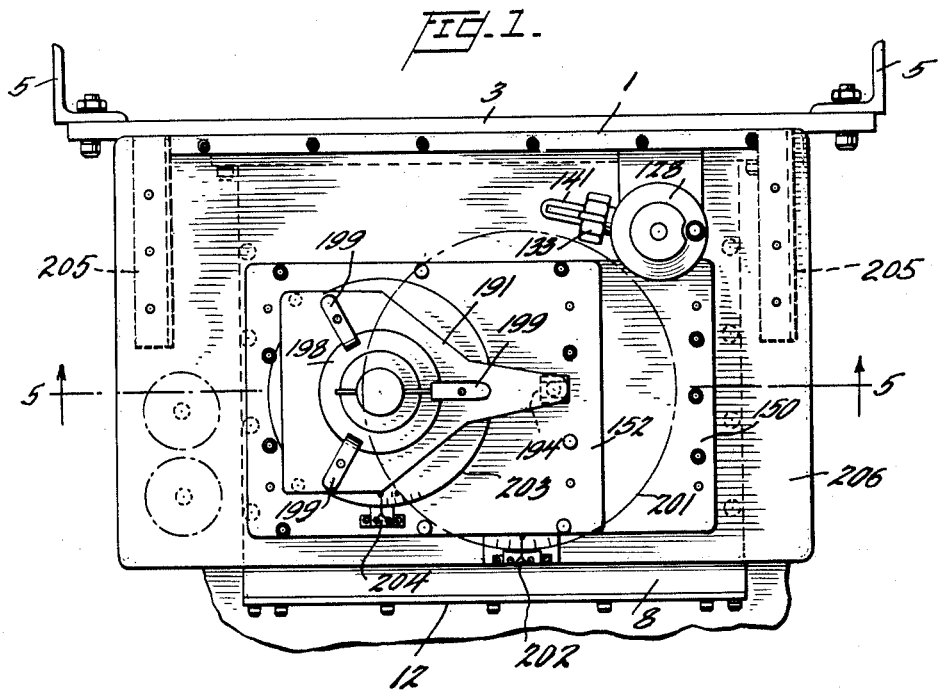
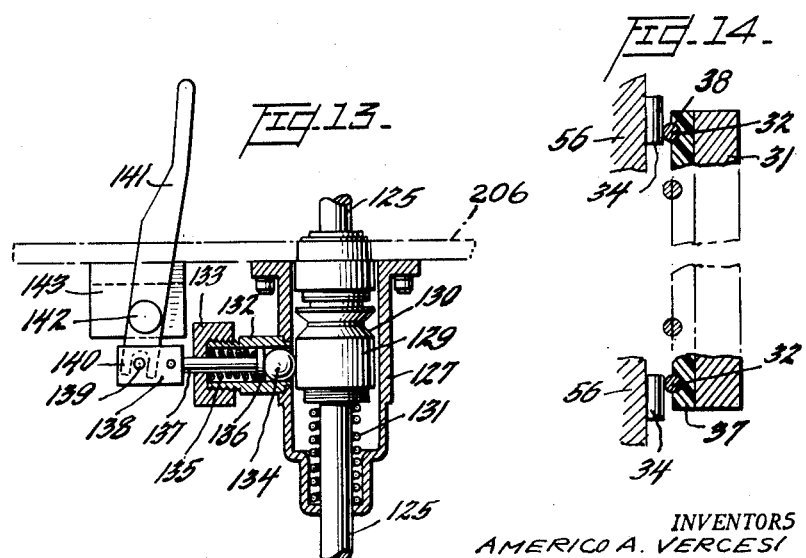
INVENTORS
AMERICO A. VERCESI
SIGMUND RAPPAPORT
BY
*Borat & Borat*
ATTORNEYS

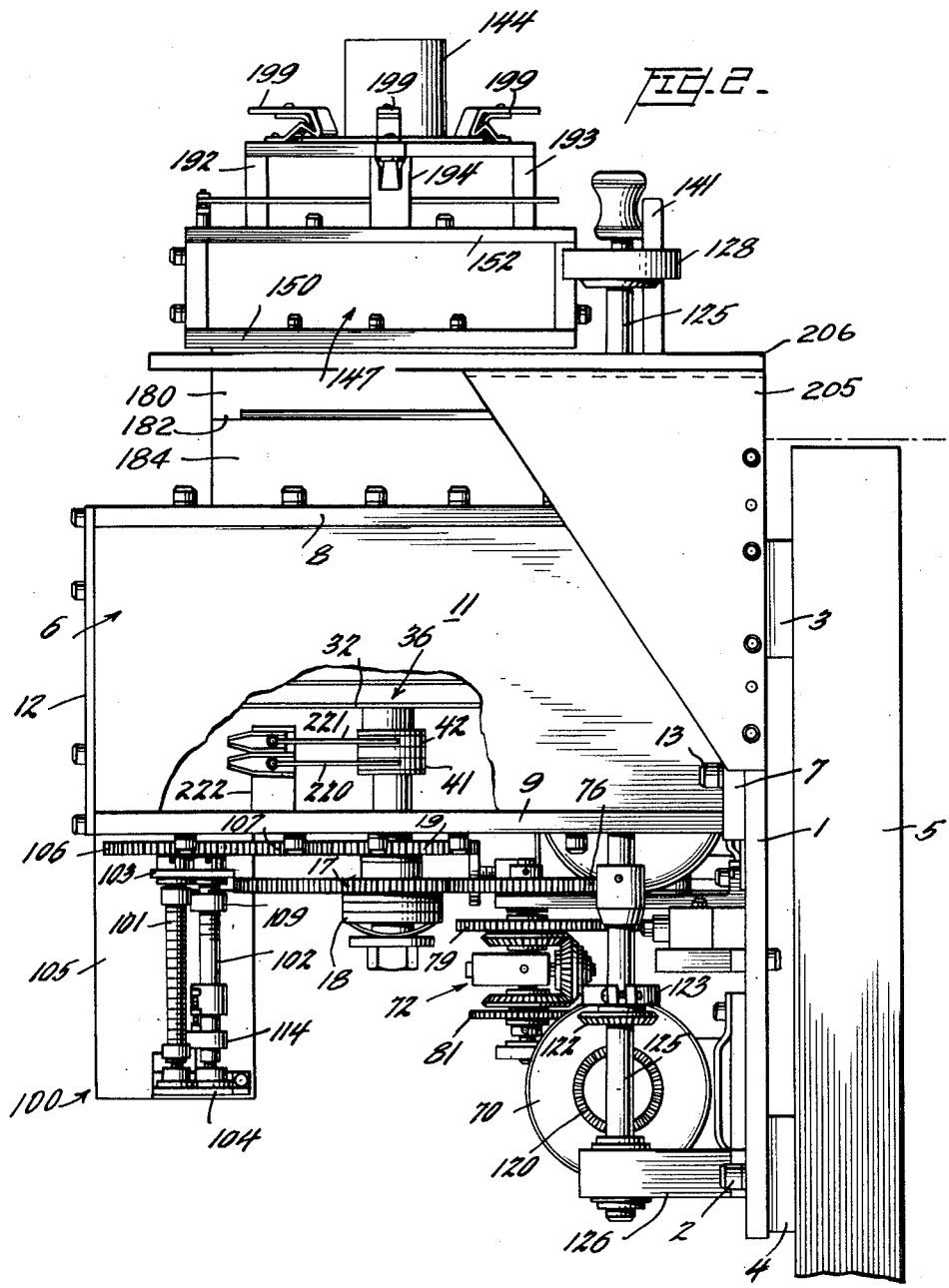

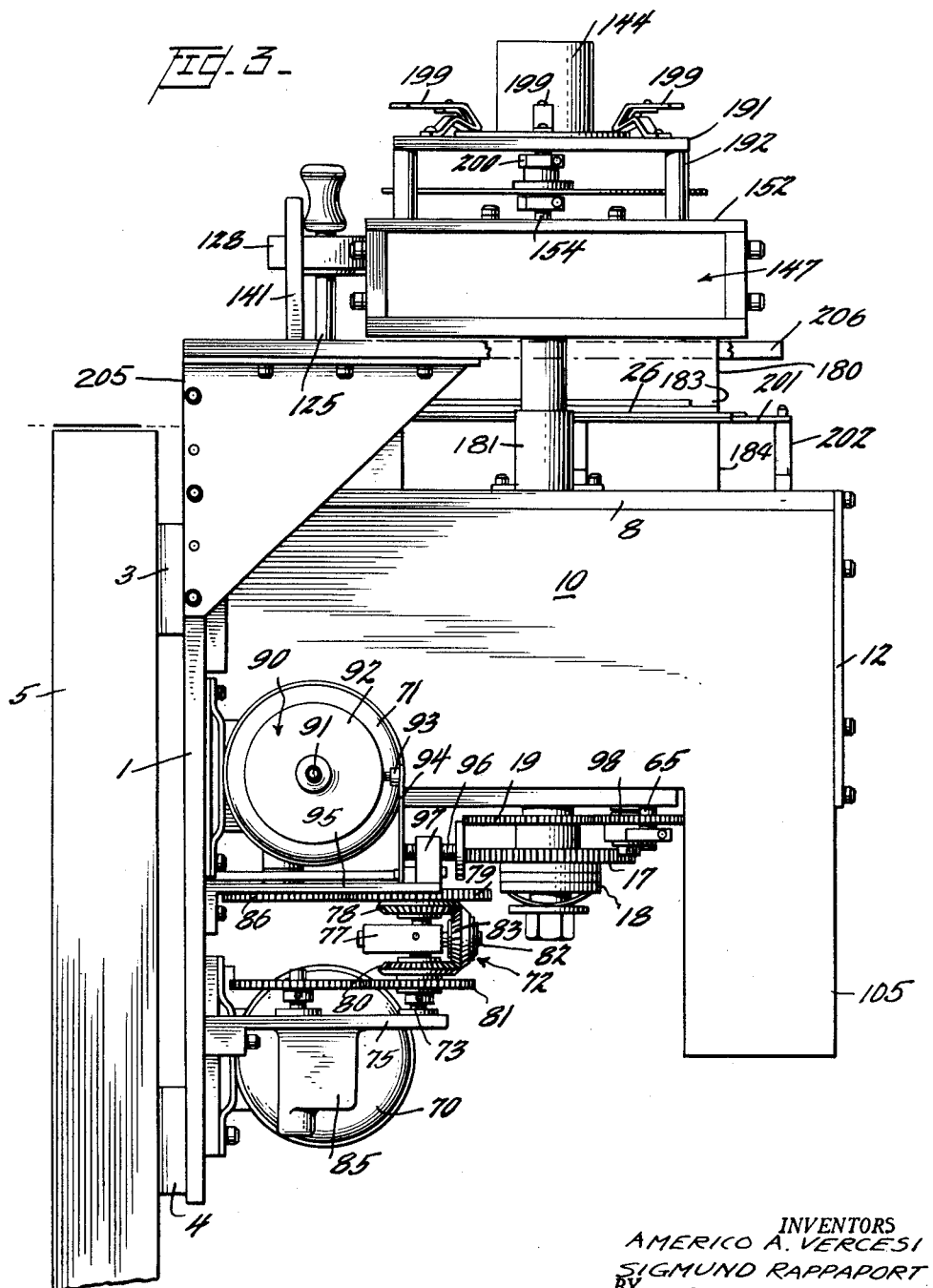

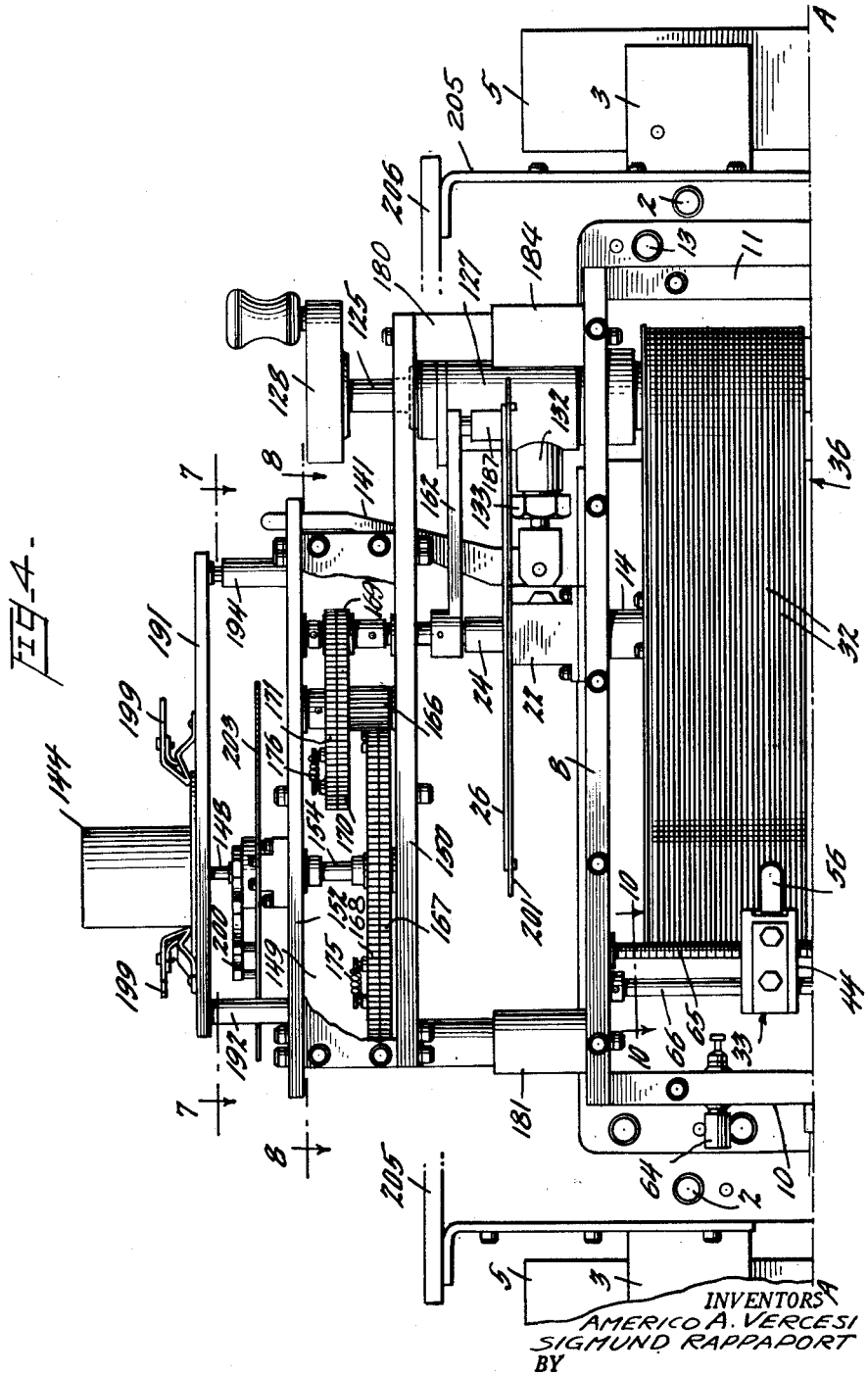

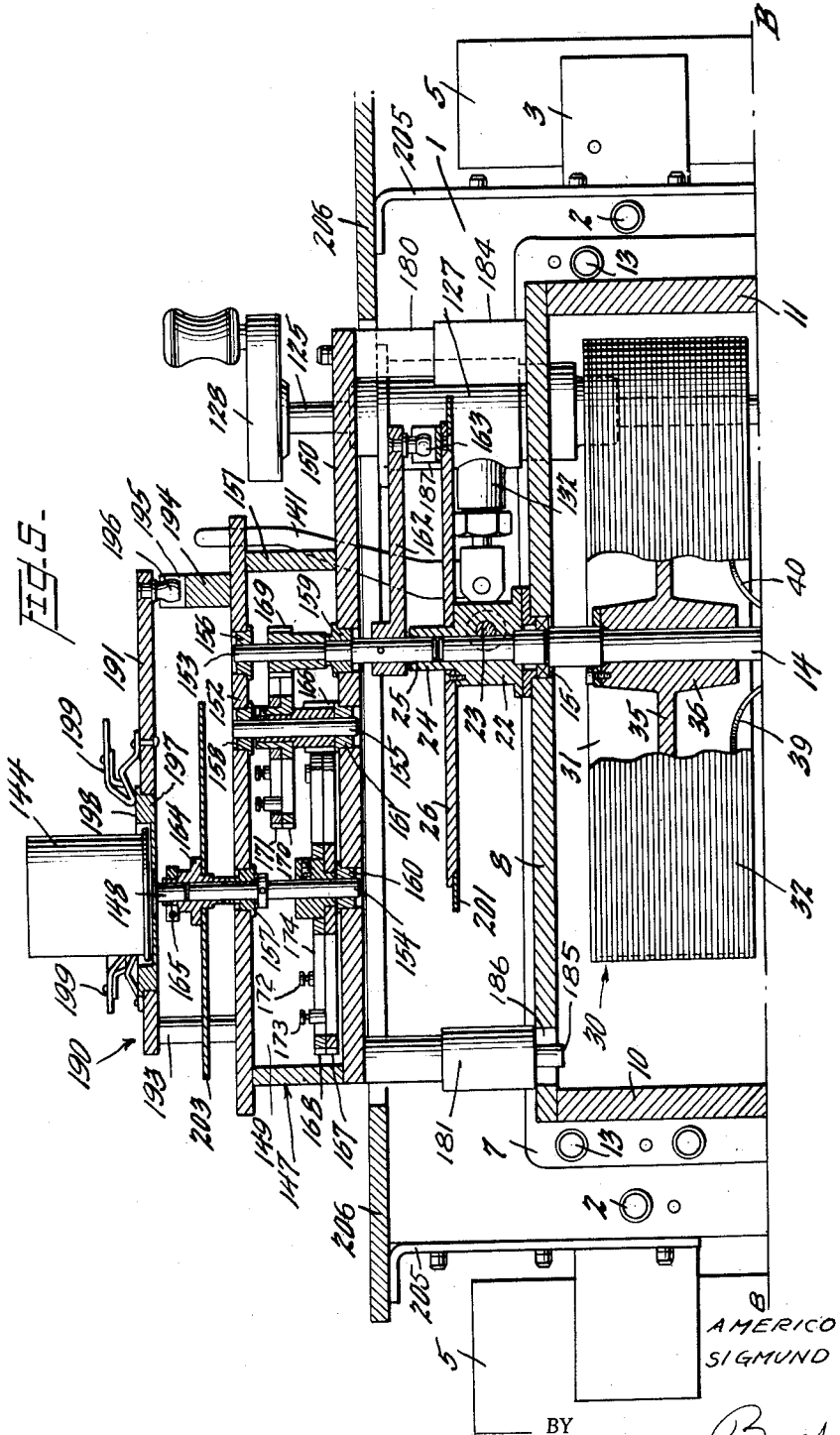

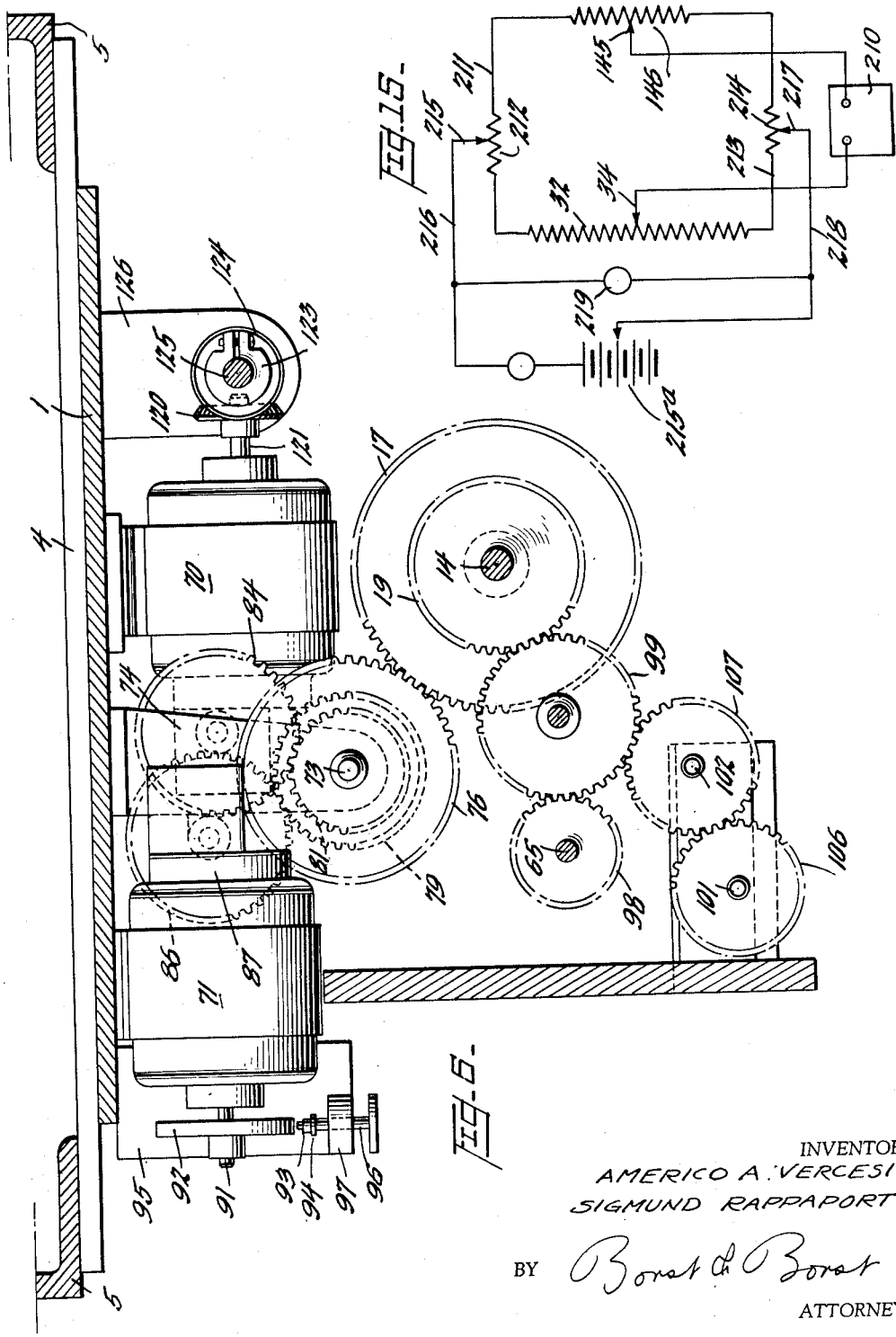

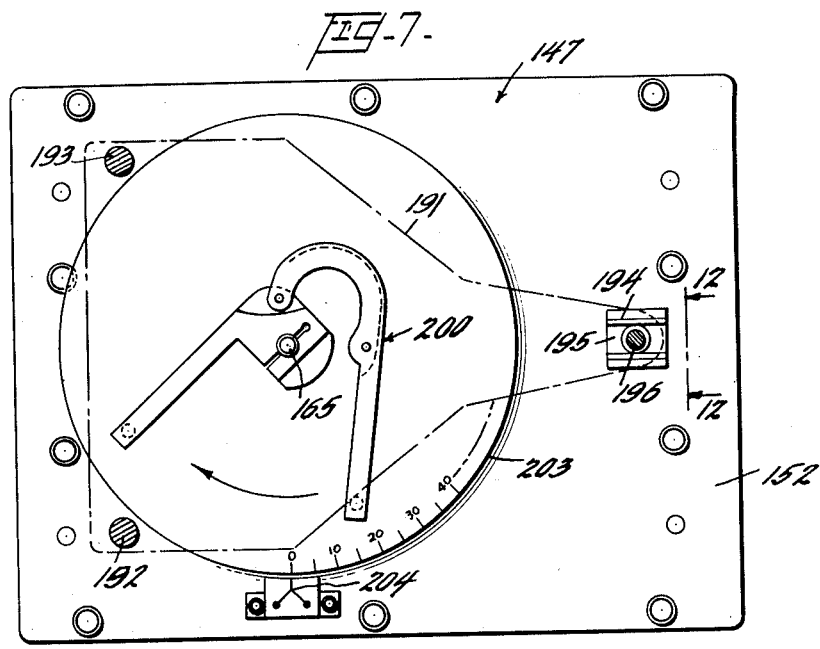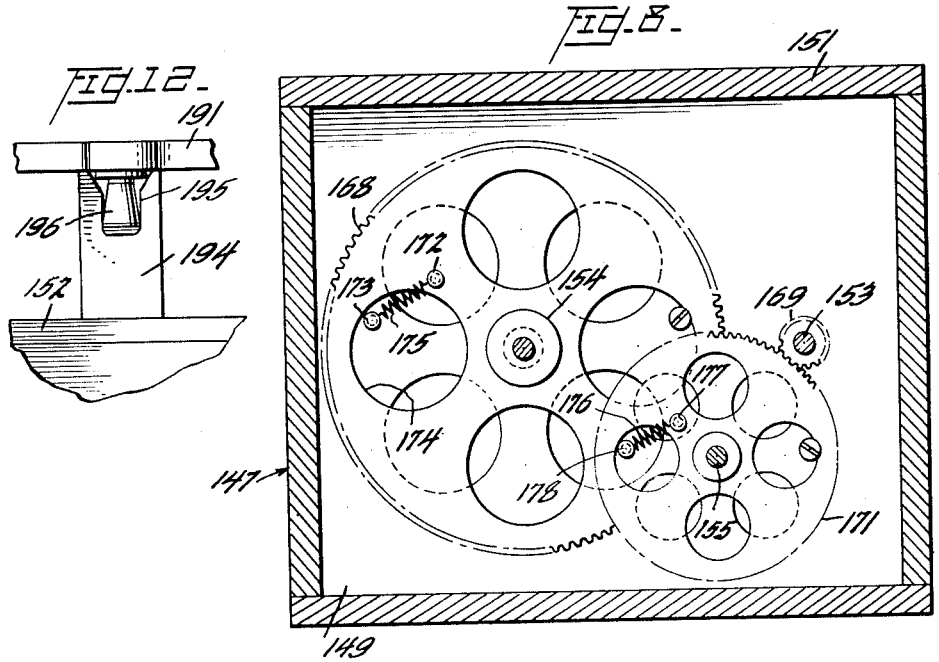

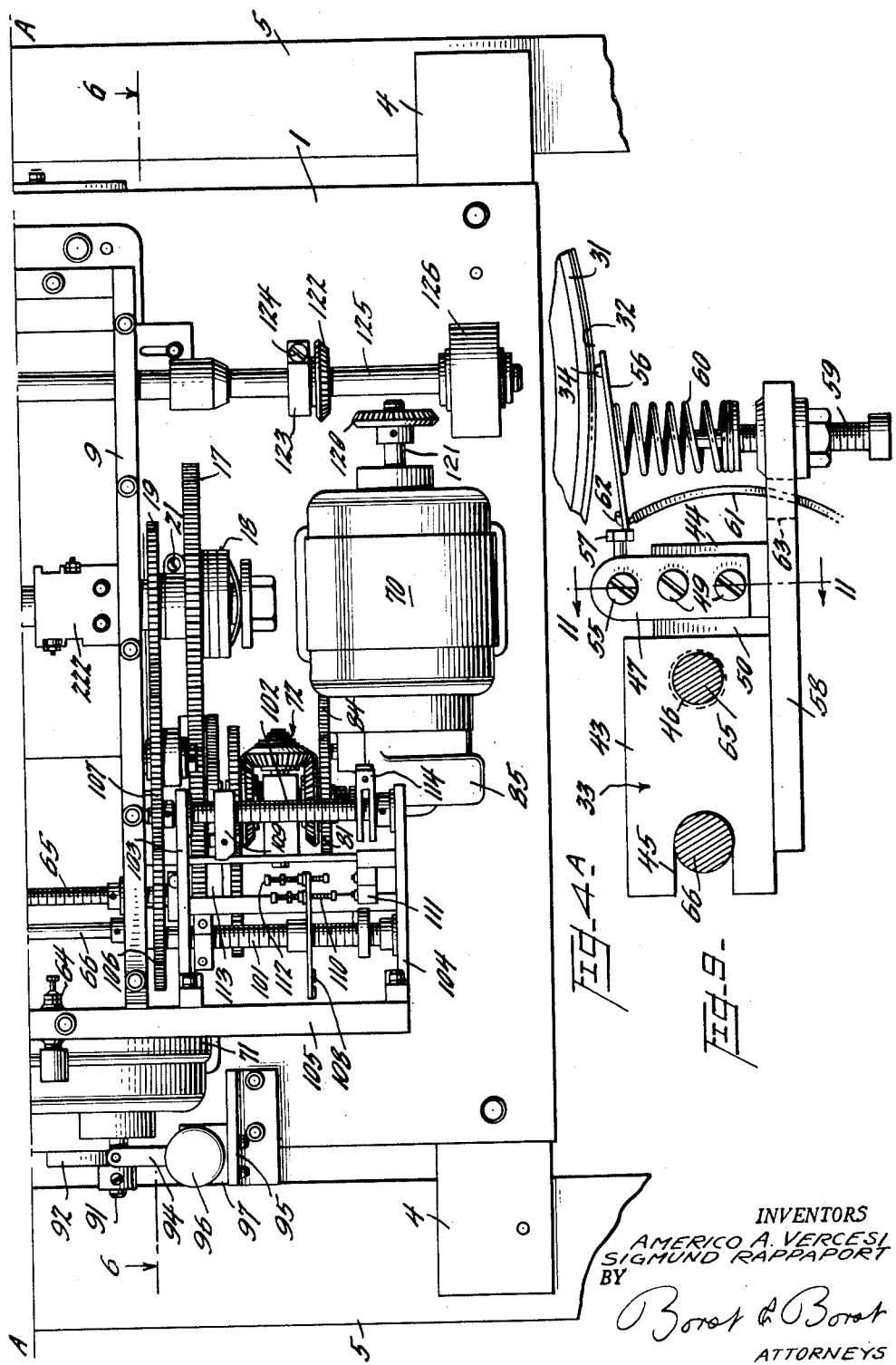

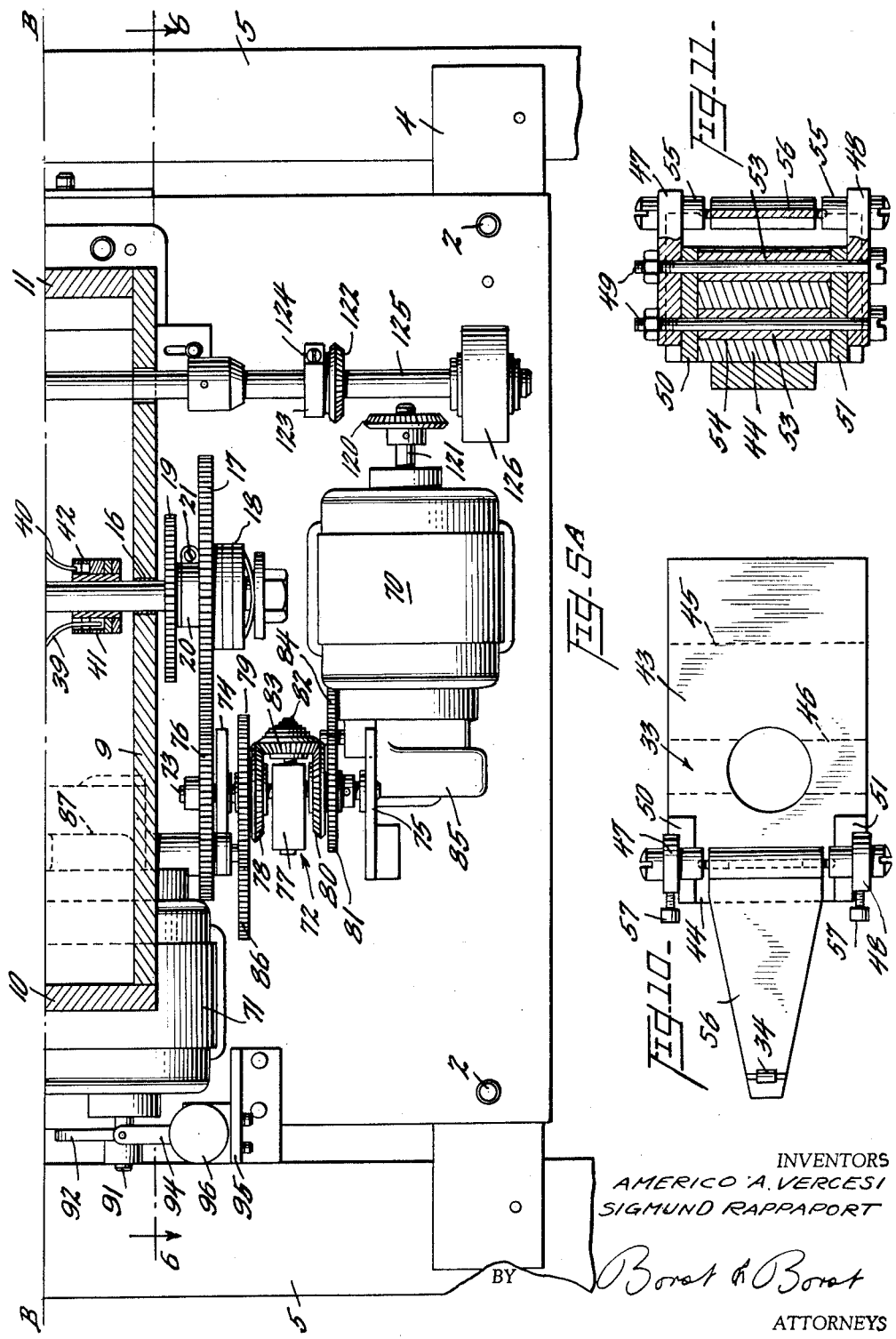

3,160,810
POTENTIOMETER LINEARITY TESTING MACHINE WITH MEANS TO PREVENT GROOVING OF WIPER
Americo A. Vercesi, Scarsdale, and Sigmund Rappaport, Port Washington, N.Y., assignors to Sperry Rand Corporation, Ford Instrument Company Division, Wilmington, Del., a corporation of Delaware
Filed June 20, 1960, Ser. No. 37,421
15 Claims. (Cl. 324—63)

This invention relates to a mechanism for accurately testing potentiometers with respect to linearity, number of turns and noise. The potentiometers to be tested are of the type in which a helically wound wire is enclosed in a cylindrical casing. The wiper through which the output voltage of the potentiometer is transmitted is carried by and moved along the wire by an axially disposed shaft which is rotatably supported by bearings within the cylindrical casing, one adjacent each end thereof. The number of turns of the wire in the potentiometers, capable of being tested by the mechanism, range from a fraction of a turn to a multiplicity of turns.

The testing mechanism comprises generally a master potentiometer having a linear output, and a minimum of noise, and means through which a potentiometer to be tested is driven by the master potentiometer at a reduced rate in accordance with the relative number of turns of the master potentiometer wire and the number of turns of the wire of the potentiometer being tested, so that while the output wiper of the master potentiometer is traveling from one end to the other end of the master convoluted wire the output wiper of the potentiometer being tested will travel from one end to the other end of the convoluted wire of the potentiometer being tested regardless of the difference between the number of convolutions of the master potentiometer wire and the number of convolutions of the potentiometer wire being tested. The output voltages of the wiper arm of the master potentiometer and the wiper arm of the potentiometer being tested are imparted to suitable comparing and indicating means by which the two output voltages are compared and indicated thereby showing the difference in linearity, and/or noise between the master potentiometer and the potentiometer being tested. If the difference between the two output voltages is within certain limits the tested potentiometer is accepted, and if not it is rejected.

The master potentiometer is mounted within a dustproof cabinet which is secured to and extends forwardly from a vertically disposed base plate which is adapted to be removably secured to a fixed support. All of the various elements of the test mechanism are mounted upon the base plate and/or cabinet. The master potentiometer comprises an enlarged horizontally disposed drum which is mounted upon a vertical drive shaft extending out through the top and bottom walls of the cabinet. The outer surface of the drum is provided with an insulating plastic film having a helical groove in which the resistance wire is disposed. The wire has a multiplicity of turns, preferably forty spaced .05 of an inch apart.

The lower end of the drive shaft is provided with a relatively large main drive gear through which the drive shaft and with it the drum mounted thereon are rotated by one or the other of the two synchronous motors, one of which is the operational motor and the other of which is a faster speed slewing motor which is used to return the mechanism to initial position at a faster speed, after a potentiometer has been tested. The two motors are operatively connected to the drive shaft gear through a conventional differential having two spaced input gears which are rotatably mounted on the spider shaft and an output gear which is secured to one end of the spider shaft. The operational motor is connected through suitable speed reduction means to one of the differential input gears and the slewing motor is connected through similar speed reduction means to the other of the differential input gears. The differential output gear is disposed in constant mesh with the large drive shaft gear.

The wiper for the master potentiometer, which is mounted upon a wiper arm carried by a block mounted upon a vertical screw shaft adjacent the periphery of the drum, is constantly spring pressed into engagement with the potentiometer wire as the drum is rotated. The screw shaft is rotated in timed relation to the rotation of the drum at such a speed, that it moves the block up and down, transversely of the drum and the helical winding thereon, that the wiper is always maintained in contact with the wire. The lower end of the screw shaft is provided with a gear through which it is rotated from a take-off gear secured to the main drive shaft adjacent the main drive gear. A limit stop means is provided which limits the movement of the wiper arm in both directions by stopping the rotation of the main drive shaft and the various elements driven thereby including the master potentiometer drum and the test potentiometer shaft when the arm reaches either end of the winding wire. The limit stop means is also driven from the take-off gear in timed relation to the rotation of the main drive shaft and the screw shaft.

The various different range potentiometer to be tested are all driven from the main drive shaft for the master potentiometer. Since the master potentiometer always makes a constant number of revolutions for a full cycle the test potentiometers must be geared to it by various ratios, depending on the ratio of the number of their turns with respect to the number of turns of the master potentiometer. To this end a plurality of different ratio interchangeable gear boxes are provided, one for each different ratio potentiometer. Assuming that the master potentiometer has forty turns and the test potentiometer has five turns, the gear ratio of the gear box must be such that the test potentiometer makes only five revolutions while the master potentiometer is making forty revolutions; and if the test potentiometer has only a fraction of a turn the ratio of the gear box must be such that the test potentiometer makes only this fraction of a revolution while the master potentiometer is making forty revolutions.

Each gear box comprises an input shaft which is adapted to be releasably connected to the main drive shaft of the master potentiometer and to be driven thereby, an output shaft to which the test potentiometer shaft is adapted to be connected, and an intermediate idler shaft. The input shaft is provided with a small pinion gear which meshes with gear means carried by the idler shaft, which also has secured thereto a small pinion gear which meshes with gear means on the output shaft. The gear means on the idler shaft consists of two identical superimposed contacting gears one of which is keyed to the idler shaft and the other of which is rotatably mounted on the idler shaft. The two gears are connected together by spring means by which they are yieldingly biased in opposite directions. And the gear means on the output shaft consists of two identical superimposed gears, one of which is keyed to the output shaft and the other of which is rotatably mounted on the output shaft, and which are connected together by spring means by which they are yieldingly biased in opposite directions. In this manner all backlash between the input shaft and the output shaft is eliminated. The center distances between the input shaft and the idler shaft and between the idler shaft and the output shaft are arranged in such a way as to make a large number of gear ratios possible while maintaining the same center distances, so that one standard gear box casing can be used for all gear ratios between the input and output shafts.

The gear box is provided adjacent one end thereof with a transverse downwardly extending spacing bar and adjacent the opposite end thereof with a downwardly extending spacing lug. The spacing bar extends from the front to the rear of the gear box and is provided with a pair of foot pads, one at each end thereof, which are adapted to slidably engage the top of the cabinet. The spacing lug, which is also adapted to slidably engage the top of the cabinet, is disposed intermediate the front and rear walls of the gear box and is provided with a reduced diameter pin which extends downwardly from the lower end thereof and is adapted to engage an elongated slot in the top wall of the cabinet. A three-point support is therefore provided for slidably mounting the gear above the cabinet.

In order to connect the input shaft of the gear box to the main drive shaft of the master potentiometer without introducing any distortions caused by slight manufacturing errors such as runout of the master shaft and/or the gear box input shaft, a sleeve with a slight bell mouth is secured to the upper end of the main drive shaft for the master potentiometer. The lower end of the gear box input shaft is inserted into the sleeve which positions the gear box and coacting with the pin and slot connection prevents any rotary movement of the gear box, due to any runout of the master shaft, while permitting a slight orbital movement thereof. The upper end of the sleeve is provided with an enlarged axially disposed disk having a radially slotted lug secured thereto at the periphery thereof; and the lower end of the gear box input shaft has an outwardly extending arm secured thereto. The outer end of the arm is provided with a downwardly extending pin which is received in the radial slot of the lug carried by the disk. The gear box input shaft will therefore be rotated by the master potentiometer shaft through the disk secured thereto, the arm secured to the lower end of the input shaft, and the pin and slot connections between the disk and arm. Any misalignment of the main and input shafts during rotation thereof will be compensated for by the relative sliding movement between the pin and slot and by the orbital movement of the gear box, without distortion of any of the component parts of the mechanism.

A graduated ring which is calibrated from 0° to 360° is secured to the disk about the periphery thereof. The ring cooperates with a fixed index mark to indicate the relative position of the main potentiometer wiper with respect to the ends of the main potentiometer winding on any turn thereof.

A holder for a potentiometer to be tested is slidably mounted, for a slight orbital movement, above the gear box in spaced relation thereto. The holder which comprises a flat plate is supported by three vertical triangularly disposed studs, two of which are secured to and extend downwardly from the plate into contact with the top of the gear box, and the other of which is secured to the top of the gear box and extends upwardly therefrom into contact with the underside of the holder plate. The upper end of the upwardly extending stud is provided with a slot which is radially disposed with respect to the gear box output shaft, and the holder plate is provided with a downwardly extending pin which is adapted to be received in the radial slot. The holder plate is also provided with an enlarged shouldered aperture in which an adapter is adapted to be removably secured in fixed position by spring fingers.

The test potentiometer is nonrotatably mounted in the adapter therefor, there being a separate adapter provided for each different size potentiometer to be tested. The adapter is then mounted in the holder plate, after which the holder is manually shifted until the test potentiometer shaft aligns with the gear box output shaft. The two shafts are then clamped together by suitable clamping means which is removably secured to the outer end of the output shaft. The three point mounting of the holder for orbital movement allows it to compensate for any eccentricity in the mounting of the test potentiometer shaft in the potentiometer casing.

A graduated dial which is calibrated from 0° to 360° is also removably secured to the upper end of the output shaft. The dial cooperates with a fixed index marker to indicate the relative position of the test potentiometer wiper with respect to the ends of the test potentiometer winding on any turn thereof.

Means are also provided by which the mechanism may be manually actuated as desired when making initial settings or adjustments.

It sometimes happens that it is desired to test a potentiometer for which no gear box having the correct ratio therefor is provided. In this case the gear box having the closest ratio is used. Let it be assumed that the master potentiometer has forty turns, that the potentiometer to be tested has four turns and that the gear box having the closest ratio thereto is for use in testing a five turn potentiometer. The ratio of this gear box is therefore such that the test potentiometer makes only five revolutions while the master potentiometer is making forty revolutions. The master potentiometer therefore makes eight revolutions while the test potentiometer is making one revolution, or thirty-two revolutions while the test potentiometer is making four revolutions. The master potentiometer wiper is therefore initially set at the beginning of the ninth turn and the input voltage to the master potentiometer so adjusted that the output voltage at the beginning of the ninth turn is the same as the input voltage to the test potentiometer. In this manner the output voltage of the test potentiometer between the first and last turns thereof can be accurately compared with the output voltage of the master potentiometer between the ninth and last turns thereof.

The principal object of the invention is to provide a simple and efficient mechanism by which various potentiometers, ranging from a fraction of one turn to a multiplicity of turns, may be quickly and accurately tested for linearity, number of turns and noise.

Having stated the principal object of the invention other and more limited objects thereof will be apparent from the following specification and the accompanying drawings forming a part thereof in which:

FIG. 1 is a top plan view of a potentiometer testing mechanism embodying our invention;

FIG. 2 is a side elevation thereof, on a slightly enlarged scale, looking from the right of FIG. 1;

FIG. 3 is a view similar to FIG. 2 looking from the left of FIG. 1;

FIGS. 4 and 4a joined together on the line A—A constitute a front elevation of the mechanism on the same scale as FIGS. 2 and 3, with closure plates removed or broken away for the purposes of illustration;

FIGS. 5 and 5a joined together on the line B—B constitute a central vertical section through the mechanism, the plane of the section being indicated by line 5—5 on FIG. 1, and the scale thereof being the same as the scale of FIGS. 2, 3, 4 and 4a;

FIG. 6 is a horizontal section taken substantially on the line 6—6 on FIGS. 4a and 5a;

FIG. 7 is a fragmentary horizontal section taken substantially on line 7—7 on FIG. 4;

FIG. 8 is a fragmentary horizontal section taken substantially on the line 8—8 on FIG. 4;

FIG. 9 is an enlarged plan view of the master potentiometer wiper mechanism as viewed from the line 10—10 on FIG. 4;

FIG. 10 is a rear elevation of the wiper mechanism shown in FIG. 9;

FIG. 11 is a detail vertical section taken on the line 11—11 on FIG. 9;

FIG. 12 is a detail view in elevation of the pin and slot mounting of the test potentiometer holder plate as viewed from the line 12—12 on FIG. 7;

FIG. 13 is a detail sectional view of the means for holding the manually actuating means in and out of operative position;

FIG. 14 is an enlarged detail view illustrating the travel of the master potentiometer wiper back and forth across the master potentiometer wire during operation; and FIG. 15 is a wiring diagram diagrammatically illustrating one means of applying a similar input voltage to both the master and test potentiometers and for applying the output voltages of the two potentiometers to an indicating or recording mechanism.

The construction and operation of the mechanism will now be specifically described in connection with the drawings by the use of reference characters. As shown therein the mechanism comprises a vertically disposed base plate 1 on which the entire mechanism is mounted. The base plate 1 is secured, by bolts 2, to a pair of horizontally disposed vertically spaced rectangular bars 3 and 4 which are in turn removably secured at each end thereof to fixed supporting means 5.

A horizontally disposed rectangular cabinet, generally indicated by the numeral 6, which comprises the rear wall 7, the top and bottom walls 8 and 9, the side walls 10 and 11 and the removable front closure plate 12, is secured by bolts 13, to the base plate 1 and extends forwardly therefrom.

A main drive shaft 14 from which all of the various elements of the mechanism are driven, as will be hereinafter explained, is rotatably mounted in fixed position within the cabinet 6 with the upper end thereof extending up through the top wall 8 of the cabinet and the lower end thereof extending down through the bottom wall 9 of the cabinet, a suitable bearing 15 carried by the top wall 8 and a bushing 16 carried by the bottom wall 9 being provided for the mounting of the shaft 14. A relatively large input gear 17 is yieldingly secured to the lower end of the shaft 14 by means of a spring pressed friction clutch 18; and a take-off gear 19 of smaller diameter than the gear 17 is rigidly secured on the shaft 14 adjacent the gear 17 by means of a split collar 20 and clamping bolt 21. A hub 22 is rigidly secured on the upper end of the shaft 14 by means of a clamping bolt 23. The hub 22 is provided with a reduced extension 24 having a cylindrical bore 25 disposed in axial alignment with the shaft 14. The hub 22 also has a relatively large diameter circular disk 26 rigidly secured thereon concentric with the shaft 14 and bore 25.

The master potentiometer which is generally indicated by the numeral 30, is of the infinite resolution type and is mounted in the closed cabinet 6 to prevent any dust, dirt or other foreign matter coming in contact therewith.

The master potentiometer 30 comprises a hollow cylindrical drum 31 having a plurality of turns of resistance wire 32 helically wound thereon, and a voltage take-off generally indicated by the numeral 33, which is provided with a wiper 34 which is always yieldingly maintained in contact with the resistance wire 32 during operation. The drum 31 is connected by a medially disposed web 35 to an axially disposed hub 36 by which the drum is mounted upon the shaft 14 in fixed position for rotation therewith. The outer surface of the drum 31 is coated with a layer of suitable insulating material 37 having a semicircular helical groove therein 38 which extends from the top to the bottom of the drum, and in which the resistance wire 32 is disposed with the ends thereof secured in fixed position to the drum 31 by any suitable means (not shown) by which the ends of the wire are insulated from the drum 31. The ends of the resistance wire 31 are connected by conductors 39 and 40 to slip rings 41 and 42 which are mounted upon the shaft 14, for rotation therewith, below the hub 36, by suitable means insulating the rings from the shaft 14 and from each other.

The voltage take-off 33 comprises a block 43 which has a reduced extension 44 at one end thereof, and a vertical slot 45 which extends from the top to the bottom of the block at the other end thereof. Between the extension 44 and the slot 45 the block 43 is provided with a threaded bore 46 parallel to the slot 45. A pair of rearwardly extending arms 47 and 48 are secured to the extension 44 by bolts 49. The arms 47 and 48 are insulated from the block 43 by Bakelite spacers 50 and 51 which are applied to the top and bottom of the extension 44; and the bolts 49 are insulated therefrom by Teflon sleeves 53 which are disposed in bores 54 in the extension 44 and through which the bolts 49 extend. The free ends of the arms 47 and 48 are provided with a pair of vertically spaced aligned trunnions 55 between which a wiper arm 56, to which the wiper 34 is secured adjacent the free end thereof, is rotatably mounted. Set screws 57, by which the trunnions 55 are secured in fixed position, are provided to permit vertical adjustment of the trunnions 55. A Bakelite bar 58, which is secured to the front face of the block 43, extends on out beyond the extension 44 and is provided with a spring retaining and adjusting screw 59 adjacent the free end thereof. A coiled spring 60, which is interposed between the screw 59 and the front face of the wiper arm 56, is provided to maintain the wiper 34 in firm contact with the resistance wire 32 during operation, as shown in FIG. 9. The voltage output from the resistance wire 32 is conducted from the wiper 34 and wiper arm 56 through a conductor 61 having one end thereof connected to the wiper arm 56 as shown, at 62, and which extends through an aperture 63 in the bar 58 and has the other end thereof connected to a terminal post 64 carried by the side wall 10 of the cabinet 6.

The voltage take-off 33 is mounted upon a vertically disposed rotatable screw 65 which is secured in fixed position adjacent the drum 31 and extends through the threaded bore 46 in the block 43. Rotation of the screw 65 will move the take-off 33 up or down, depending on the direction of rotation. A post 66 which extends through the slot 45 in the block 43 is provided to prevent turning of the take-off 33 during rotation of the screw 65.

The main shaft 14 is rotated in either direction at a slow speed by an operational motor 70, and at a higher speed by a slewing motor 71, both of which are mounted in fixed position on the base plate 1 and are operatively connected to the input gear 17, on the shaft 14, through a conventional differential generally indicated by the numeral 72. During testing the operational motor 70 is used, and the slewing motor 71 is provided to quickly return the mechanism to initial starting position after each testing of a potentiometer preparatory for testing the next potentiometer.

The differential 72 comprises a spider shaft 73 which is rotatably mounted by and between brackets 74 and 75 which are secured to and extend forwardly from the base plate 1. A spur gear 76 is rigidly secured to the upper end of the spider shaft 73 in mesh with the input gear 17 on the shaft 14; and a spider 77 is pinned to the spider shaft 73 intermediate the ends thereof. A bevel gear 78 and a spur gear 79, which is integral with the bevel gear 78 or otherwise rigidly connected, are rotatably mounted upon the spider shaft 73 between the spider 77 and the bracket 74; and a similar bevel gear 80 and a connected spur gear 81 are rotatably mounted on the spider shaft 73 between the spider 77 and the bracket 75. The spider 77 is provided with a stud 82 on which a bevelled pinion gear 83 is rotatably mounted in mesh with the bevel gears 78 and 80. A spur gear 84 which is disposed in mesh with the gear 81 on the spider shaft 73 is adapted to be rotated by the operational motor 70 through suitable speed reduction means contained in a casing 85 carried by the motor 70; and a spur gear 86 which is disposed in mesh with the gear 79 on the spider shaft 73 is adapted to be rotated by the slewing motor 71 through suitable speed reduction means contained in a casing 87 carried by the motor 71. When, as is characteristic of differentials of this type, the bevel gear 78 and spur gear 79 are connected thereto and are held stationary the input gear 17 and shaft 14 will be rotated by the operational motor 70 through the meshing gears 84 and 81, bevel gear 80, pinion gear 83, spider 77 and spider shaft 73, and gear 76 secured to the spider shaft 73 in mesh with the input gear 17; and when the bevel gear 80 and spur gear 81 connected thereto are held stationary the input gear 17 and shaft 14 will be rotated by the slewing motor 71 through the meshing gears 86 and 79, bevel gear 78, pinion gear 83, spider 77 and spider shaft 73, and the gear 76 secured to the spider shaft 73 in mesh with the gear 17.

Since the speed reduction between the slewing motor 71 and the differential 72 is considerably less than the speed reduction between the operational motor 70 and the differential 72, there is a possibility that the slewing motor 71, the speed reduction means therefor, and the gear train therefrom to the differential 72 will not maintain the bevel gear 78 during operation of the operational motor 70, in which case some, if not all, of the output of the operational motor 70 will be imparted through the pinion gear 83, bevel gear 78 and meshing gears 79 and 86 to the slewing motor 71 instead of to the gear 17 and shaft 14 through the spider shaft 73 and gear 76 thereon. In order to eliminate this possibility a brake, generally indicated by the numeral 90, is applied to the rear projecting end of the armature shaft 91 of the slewing motor 71 in order to increase the resistance to turning thereof. The brake 90 comprises a brake disk 92 which is rigidly secured to the armature shaft 91, and a brake shoe 93 which is carried by the upper free end of a slightly resilient arm 94 by which it is held in contact with the periphery of the disk 92. The lower end of the arm 94 is fastened to a bracket 95 which is secured to and extends forwardly from the base plate 1. The pressure with which the brake shoe 93 engages the disk 92 may be adjusted by means of a set screw 96 which is threaded through an aperture in block 97 mounted on the bracket 95 in position for the set screw 96 to engage the arm 94.

The screw 65 by which the voltage take-off 33 is moved up and down during the rotation of the main shaft 14 and the master potentiometer drum 31 has gear 98 secured to the lower end thereof through which the screw 65 is rotated by the take-off gear 19 through an intermediate idler gear 99. The ratio between the gears 19 and 98 is such that as the wiper 34 is maintained in contact with the convoluted resistance wire 32 on the drum 31 as the take-off 33 is moved up and down during rotation of the drum 31, the wiper 34 has a slight wiping movement transversely relative to the wire at the point of contact, thereby preventing the wearing of a groove in the wiper 34 which would otherwise occur and soon cut all the way through the wiper if it always engaged the wire at the same place. This wiping movement of wiper 34 transversely relative to the wire 32 during operation is diagrammatically shown in FIG. 14. With reference to FIG. 14 let it be assumed that the resistance wire 32, helically wound upon the master potentiometer drum 31, has forty turns spaced .05 of an inch apart which makes the distance between the lowermost and the uppermost turns two inches. The ratio between the gears 19 and 98 is such that during forty revolutions of the drum 31 in one direction the wiper 34 is moved downwardly 2.03 inches from the uppermost turn to the lowermost turn, and during forty revolutions of the drum in the opposite direction the wiper 34 is moved upwardly 2.03 inches from the lowermost turn to the uppermost turn, thereby providing a differential movement of .03 inch to the wiper with respect to the wire. The wear on the wiper arm 34 is therefore distributed over this .03 of an inch instead of being concentrated on one spot. The length of the wiper 34 is somewhat less than the .05 inch distance between turns, in order to insure that the wiper never engages two turns of the wire at one time.

As previously stated, during operation the wiper 34 travels back and forth between a definite fixed position on the uppermost turn of the wire 32 and a definite fixed position on the lowermost turn thereof. It is therefore essential for accurate testing that the rotation of the drum 31 always be stopped with the wiper 34 in one of these positions. Limit stop means 100 is therefore provided, for this purpose, which is operative to cut off the current to the motor then operating shortly before the wiper 34 reaches one or the other of these stop positions to which it is approaching, and to mechanically positively stop the rotation of the drum 31 and all of the other elements driven by the main shaft 14.

The limit stop means 100 comprises a pair of vertically disposed screws 101 and 102 which are rotatably supported by and between a pair of brackets 103 and 104 which are secured to and extend outwardly from a downward extension 105 of the side wall 10 of the cabinet 6. The upper ends of the screws 101 and 102, are provided with meshing gears 106 and 107 respectively through which they are rotated from the output gear 19, on the main shaft 14, through the intermediate idler gear 99 which also meshes with the gear 107, secured to the limit stop screw 102, as well as the gear 98 secured to the take-off screw 65. An arm 108 is mounted on the screw 101 for vertical up and down movement thereon as the screw 101 is rotated, and a block 109 is mounted on the screw 102 for vertical up and down movement thereon as the screw 102 is rotated. The arm 108 carries an adjustably mounted member 110 which is adapted to actuate a switch 111 to cut off the current to the operational motor 70 when the arm 108 is at the lower limit of its movement, and a similar adjustably mounted member 112 which is adapted to actuate a switch 113 to cut off the current to the slewing motor 71 when the arm 108 is at the upper limit of its movement. The limit stop screw 102 also has an abutment 114 adjustably mounted thereon which is adapted to be clamped to the screw 102 in adjusted position for rotation therewith. After the current to the motor 70 has been cut off by the switch 111, or to the motor 71 by the switch 113, the mechanism will continue to rotate a slight amount due to inertia. The limit stop screw 102, and the block 109 and abutment 114 mounted thereon are therefore provided to positively stop this additional movement due to inertia at the proper time by the engagement of the block 109 with the bracket 103 or the abutment 114.

Manually actuated means are provided by which the mechanism can be slowly manually operated when making initial settings and/or adjustments. This means comprises a small bevel gear 120, which is secured to the rear projecting end of the armature shaft 121 of the motor 70, and a cooperating bevel gear 122 which is adjustably mounted by a clamp 123 and bolt 124 on a vertically disposed shaft 125. The shaft 125 is rotatably supported at the lower end thereof, for vertical adjustment between upper and lower positions, by a bearing bracket 126 which is mounted on the base plate 1, and a casing 127 adjacent the upper end thereof which is mounted on the top wall 8. The upper end of the shaft 125 is provided with a crank 128 by which the shaft 125 is manually rotated and is raised and lowered between its lower operative position and its upper inoperative position. Within the casing 127 the shaft 125 is provided with an enlarged collar 129 having an annular V-shaped groove 130 thereabout. A coiled compression spring 131 disposed about the shaft 125 within the casing 127 under the collar 129 normally holds the shaft 125 in its upper inoperative position, as shown in FIGS. 5a and 13, with the gear 122 out of mesh with the gear 120. The casing 127 is provided with a tubular sleeve 132 which extends horizontally outwardly from one side thereof and has the outer free end thereof closed by a cap 133 which is threaded thereon. A ball 134 and a coiled compression spring 135 are disposed within the sleeve 132 with a disk 136 interposed therebetween. The disk 136 is connected to the inner end of a rod 137 which extends out through a central aperture in the cap 133 and has a block 138 secured to the outer end thereof. The block 138 carries a pin 139 which is screwed in the bifurcated lower end 140 of a lever 141 which is pivoted at 142 to a bracket arm 143. When the shaft 125 is depressed against the resistance of the spring 131, to its lower operative position the gear 122 on the shaft 125 meshes with the gear 120 on the armature shaft 121 of the motor 70, and the V-shaped groove 130 in the collar 129 registers with the ball 134 which is yieldingly pressed into the groove 130 and is then operative to hold the shaft 125 in depressed operative position while permitting rotation thereof. From this it will be apparent that manual rotation of the shaft 125 will be imparted to the main shaft 14 of the mechanism through the motor 70 and the differential and gearing interposed between the motor 70 and the shaft 14. After manual operation the lever 141 is rocked clockwise which withdraws the disk 136 out of contact with ball 134 and compresses the spring 135 thereby permitting the spring 131 to cam the ball 134 out of the groove 130 back into the sleeve 132 and raise the shaft to and hold it in inoperative position.

As previously stated the testing mechanism is adapted for testing various different potentiometers in which the number of turns of the resistance wires thereof may vary from a fraction of a turn to a multiplicity of turns, and that during testing the output wiper 34 of the master potentiometer traverses the resistance wire 32 thereof at and in the same time that the output wiper 145 of a test potentiometer traverses the resistance wire 146 thereof (FIG. 15) from end to end. Since the master potentiometer has a fixed number of turns of the resistance wire thereof which is greater than the number of turns of any test potentiometer, and since the test potentiometer is driven from the main shaft 14 of the master potentiometer it is necessary to interpose a speed reduction gear box, generally indicated by the numeral 147, between the master potentiometer shaft 14 and a test potentiometer shaft 148 having a speed reduction ratio that the rate of travel of the test potentiometer wiper 145 will be maintained proportional to the rate of travel of the master potentiometer wiper 34. Assuming that the maser portentiometer has forty turns of resistance wire, and the test potentiometer has only 5, the ratio of the gear box 147 must be such that the wiper 145 of the test potentiometer will traverse the five turns thereof in the same time that the wiper 34 of the master potentiometer is traversing the forty turns thereof. Since the testing mechanism is to be used for testing various different test potentiometers, all having a different number of turns of resistance wire, a plurality of similar different ratio interchangeable gear boxes 147 are provided, one for each different potentiometer to be tested.

Each gear box 147 comprises a bottom plate 150 having a housing 149 having a rectangular annular wall 151 secured thereto and extending upwardly therefrom, and a top closure plate 152 which is secured to the upper end of the wall 151. An input shaft 153, an output shaft 154 and an intermediate idler shaft 155 are all rotatably mounted within the housing 149 by bearing bushings 156, 157 and 158 carried by the top plate 152, and similar bushings 159, 160 and 161 carried by bottom plate 150. The lower end of the input shaft 153 extends down below the bottom plate 150 and has an elongated arm 162 pinned thereon. The arm 162 has a downwardly extending knob 163 secured thereto adjacent the outer free end thereof. The upper end of the output shaft 154 extends up beyond the top closure plate 152 and has a collar 164 secured thereon. The top of the collar 164 is provided with a downwardly extending socket 165 which is disposed in axial alignment with the output shaft 154. The intermediate idler shaft 155 has a pinion gear 166, secured thereon, which is in constant mesh with a pair of superimposed similar gears mounted on the output shaft 154, the lower one of which, 167, is rigidly secured to the shaft 154 and the upper one of which, 168, is rotatably mounted on the shaft 154. The input shaft 153 has a pinion gear 169 rigidly secured thereon in constant mesh with a pair of similar superimposed gears also mounted on the idler shaft 155, the lower one of which, 170, is rigidly secured to the idler shaft 155, and the upper one of which, 171, is rotatably mounted thereon. The upper gear 168 on the output shaft 154 is provided with an upwardly extending pin 172, and the lower gear 167 on the output shaft 154 is provided with a similar pin 173 which extends up through a cut out section 174 in the upper gear 168. A coiled tension spring 175 which is connected to and between the upper ends of the pins 172 and 173 yieldingly biases the gears 167 and 168 in opposite directions. The gears 170 and 171 are similarly yieldingly biased in opposite directions by a tension spring 176, similar to the spring 175, which is connected to and between the upper ends of pins 177 and 178, similar to the pins 172 and 173 which are carried by the gears 171 and 170, respectively. In this way all backlash in the gear train between the input shaft 153 and the output shaft 154 is eliminated when the direction of rotation of the input shaft is reversed.

The gear box 147 is adapted to be slidably mounted, for slight orbital movement, on the top wall 8 of the cabinet 6. For this purpose the bottom plate 150 of the gear box 147 has a traversely extending spacer 180 secured to the underside thereof which extends from the front to the rear of the bottom plate 150, and a medially disposed post 181 which is secured to the underside of the plate 150 adjacent the other end thereof. The spacer 180 is provided with a pair of foot pads 182 and 183, one at each end thereof, which are adapted to seat on the upper surface of a cross member 184 which is secured to the upper surface of the top wall 8 of the cabinet 6; and the lower end of the post 181 is provided with a stud 185 which is adapted to be inserted in an elongated slot 186 in the top wall 8 which is radially disposed with respect to the axis of the main shaft 14. In use the gear box 147 is removably mounted in this manner on the top wall 8 of the cabinet 6 with the lower end of the input shaft 153 inserted into the bore 25 in the hub 22. The disk 26 has a lug 187, secured thereto adjacent the periphery thereof, having a radially disposed slot therein in which the knob 163 carried by the arm 162 is disposed during operation. It will therefore be seen that rotation of the main shaft 14 will be imparted to the input shaft 153 of the gear box 147 through the disk 26, slotted lug 187, knob 163, and arm 162, and from the input shaft 153 to the output shaft 154 through the reducing gear train interposed therebetween.

A potentiometer to be tested is removably mounted in a holder 190 which is slidably mounted, for slight orbital movement, on the closure plate 152 of the gear box 147. The holder 190 comprises a flat plate 191 which is supported in spaced relation above the gear box 147 by the triangularly disposed studs, two of which, 192 and 193, are secured to the underside of the plate 191 and extend downwardly therefrom into contact with top plate 152 of the gear box 147, and the other of which, 194 is secured to the top plate 152 of the gear box 147 and extends upwardly therefrom into contact with the underside of the holder plate 191. The upper end of the stud 194 has a radially disposed slot 195 therein for reception of a knob 196 which is secured to the underside of the plate 191.

The holder plate 191 is provided with an enlarged shouldered aperture 197 in which an adapter 198 is removably mounted by a plurality of spring clips 199. The test potentiometer 144 is removably mounted in the adapter, there being a separate adapter for each different size potentiometer. The test potentiometer shaft 148 is inserted into the socket 165 in the hub 164 secured to the gear box output shaft 154, and is removably clamped therein by suitable clamping means 200. Any misalignment of the main shaft 14 and the gear box input shaft 153, or between the gear box output shaft 154 and the test potentiometer shaft 148 will be automatically compensated for, without distortion of any of the component parts of the mechanism, by the orbital mounting of the gear box 147 and the test potentiometer holder plate 191.

The disk 26, carried by the hub 22 secured to the master shaft 14, is provided about the periphery thereof with a graduated dial ring 201 which is calibrated from 0° to 360° and cooperates with a fixed index mark 202 to indicate the angular position of the master potentiometer wiper 34 with respect to any turn of the resistance wire 32; and the hub 164 on the gear box output shaft 154 has a graduated dial 203, secured thereto, which is calibrated from 0° to 360° and cooperates with a fixed index mark 204 to indicate the angular relation of any turn of the test potentiometer resistance 146 with respect to the wiper 145 thereof.

The base plate 1 is provided at the upper end thereof with a pair of brackets 205, one at each side thereof, on which a table top 206 surrounding the mechanism is mounted.

In testing a potentiometer the wipers of the master and test potentiometers and the dials 201 and 203 are all set in zero position. The test potentiometer shaft 148 is then clamped to the gear box output shaft 154 for rotation therewith. The same voltage is applied to the input ends of the master potentiometer resistance 32 and the test potentiometer resistance 146. The output of the master potentiometer through the wiper 34 and the output of the test potentiometer through its wiper 145 are imparted to suitable conventional comparing means 210 by which the output of the test potentiometer is compared to the output of the master potentiometer. The comparing means 210 may be an oscillograph by which the difference of the two outputs is graphically recorded, or an oscilloscope by which the difference of the two outputs is visually indicated for comparing, or it may be any one of various other recording and/or comparing means.

One manner of connecting the master potentiometer and the test potentiometer to a source of D.C. voltage and for imparting the voltage outputs thereof to a recording and/or comparing means is shown very schematically in FIG. 15. As shown therein the input ends of the master potentiometer resistance winding 32 and the test potentiometer resistance winding 146 are connected together by a conductor 211 in which a voltage divider 212 is interposed; and the output ends thereof are connected together by a conductor 213 in which a voltage divider 214 is interposed. The tap 215 of the voltage divider 212 is connected to one side of a variable source 215a of D.C. voltage by a conductor 216, and the tap 217 of the voltage divider 214 is connected to the other side of the voltage source 215a by a conductor 218. By adjusting the voltage divider 212 the same voltage can be imparted to the input ends of both the master potentiometer winding 32 and the test potentiometer winding 146; and by adjusting the voltage divider 214 the output voltage of both the master potentiometer winding 32 and the test potentiometer winding 146 can be equalized. A voltmeter 219 is provided for reading the voltage across the bridge 215 and 217. The conductors 211 and 213 are connected to the ends of the master potentiometer resistance winding 32 on the drum 31 through resilient wiping fingers 220 and 221 which are carried by a terminal block 222 in contact with the slip rings 41 and 42 on the main shaft 14.

From the foregoing it will be apparent to those skilled in this art that we have provided a very efficient mechanism for quickly and accurately testing various different potentiometers with respect to linearity, angle and noise.

It is to be understood that we are not limited to the specific construction shown herein as various modifications may be made therein within the spirit of the invention and the scope of the appended claims.

What is claimed is:

1. In a potentiometer testing mechanism of the character described comprising a master potentiometer having a rotatable drum on which a plurality of turns of resistance wire are helically wound and a voltage output wiper which is adapted to be maintained in continuous contact with said resistance wire as said drum is rotated; gearing means connected between said wiper and said drum for causing said wiper to move transversely of said resistance wire from one end of the potentiometer to the other, said transverse movement being greater than the axial length of the helically wound potentiometer from its lowermost turn to its uppermost turn whereby said wiper has at its point of contact a slight wiping movement transversely relative to said wire; a holder for a test potentiometer having a helically wound resistance wire, a voltage output wiper adapted to contact said test potentiometer resistance wire, and a rotatably mounted shaft which is adapted to move said test potentiometer wiper transversely of said test potentiometer wire as said shaft is rotated; means by which said master potentiometer drum and a test potentiometer shaft are rotated at a predetermined ratio with respect to each other; means by which a predetermined input voltage is applied to said master potentiometer and to a test potentiometer.

2. In a potentiometer testing mechanism as defined by claim 1 which includes a rotatable main shaft upon which said master potentiometer drum is mounted, an operational motor, a slewing motor, a differential through which said main shaft is adapted to be rotated by said operational motor and to be operated at a higher speed by said slewing motor, and connecting means through which a test potentiometer shaft is adapted to be rotated by said main shaft.

3. In a potentiometer testing mechanism as defined by claim 2 in which said connecting means comprises: a detachable gear box having an input shaft and an output shaft which is driven by said input shaft through interconnecting reduction gearing, means by which said main shaft is detachably connected to said gear box input shaft, and means by which said gear box outlet shaft is adapted to be connected to a test potentiometer shaft.

4. In a potentiometer testing mechanism as defined by claim 3 in which adjustable limit stop means is provided by which the rotation of said main shaft may be selectively limited in each direction.

5. In a potentiometer testing mechanism as defined by claim 4 in which said gear box and said holder are mounted in said mechanism for slight orbital movement.

6. In a potentiometer testing mechanism as defined by claim 5 in which means are provided by which said mechanism may be manually actuated when initially setting or adjusting said mechanism 7. In a potentiometer testing mechanism as defined by claim 5 in which said main shaft is provided with a graduated dial means by which the relative position of said master potentiometer wiper with respect to said main potentiometer wire is indicated, and said gear box shaft output is provided with a similar dial means by which the relative position of a test potentiometer wiper with respect to the winding thereof is adapted to be indicated.

8. In a potentiometer testing mechanism as defined by claim 7 in which means are provided by which said mechanism may be manually actuated when initially setting or adjusting said mechanism.

9. In a potentiometer testing mechanism of the character described comprising: a master potentiometer having a rotatable drum on which a plurality of equally spaced turns of resistance wire are helically wound, a rotatable main shaft upon which said drum is mounted for rotation therewith, a rotatably mounted screw shaft, a transversely movable output wiper, through which the output voltage of said master potentiometer is delivered, mounted upon said screw shaft in continuous contact with said resistance wire, motor means operatively connected to said main shaft by which said main shaft and said drum are selectively rotated in first one direction and then the other, limit stop means by which the rotation of said main shaft and said drum are limited in each direction, interconnecting gear means between said main shaft and said screw shaft through which said screw shaft is rotated in such timed relation to the rotation of said main shaft that said wiper is always maintained in contact with said resistance wire during rotation of said drum and is accorded a transverse movement, with respect to said resistance wire, from one end of the potentiometer to the other which is greater than the axial length of the helically wound potentiometer from its lowermost turn to its uppermost turn whereby said wiper has at its point of contact a slight wiping movement transversely relative to said wire, and interconnecting gear means between said main shaft and said limit stop means through which said limit stop means is actuated in timed relation to the rotation of said main shaft and said screw shaft; a holder in which a test potentiometer, having a transversely movable voltage output wiper and an actuating shaft therefor, is adapted to be removably secured; interconnecting means between said main shaft and the actuating shaft of a test potentiometer through which the output wiper of said master potentiometer and the output wiper of a test potentiometer are each moved at a predetermined rate with respect to each other; means by which a predetermined input voltage is applied to said master potentiometer and to a test potentiometer.

10. In a potentiometer testing mechanism as defined by claim 9 in which indicating means are provided by which the relative positions of said master potentiometer wiper and a test potentiometer wiper are indicated.

11. In a potentiometer testing mechanism as defined by claim 10 in which means are provided by which said mechanism may be manually and independently actuated when initially setting or adjusting said mechanism.

12. In a potentiometer testing mechanism as defined by claim 9 in which said motor means comprises an operational motor by which said main shaft is adapted to be rotated and a slewing motor by which said main shaft is adapted to be rotated at a higher speed.

13. In a potentiometer testing mechanism as defined by claim 12 in which said operational motor and said slewing motor are each operatively connected to said main shaft through a differential interposed between said motor and said main shaft.

14. In a potentiometer testing mechanism as defined by claim 13 in which indicating means are provided by which the relative positions of said master potentiometer wiper and a test potentiometer wiper are indicated.

15. In a potentiometer testing mechanism as defined by claim 14 in which means are provided by which said mechanism may be manually and independently actuated when initially setting or adjusting said mechanism.

References Cited by the Examiner

UNITED STATES PATENTS

| | | | |
|---|---|---|---|
| 2,469,465 | 5/49 | Hamilton et al | 324—62 |
| 2,715,208 | 8/55 | Hayes | 324—63 |

WALTER L. CARLSON, *Primary Examiner.*

SAMUEL BERNSTEIN, *Examiner.*